United States Patent Office 3,043,114
Patented July 10, 1962

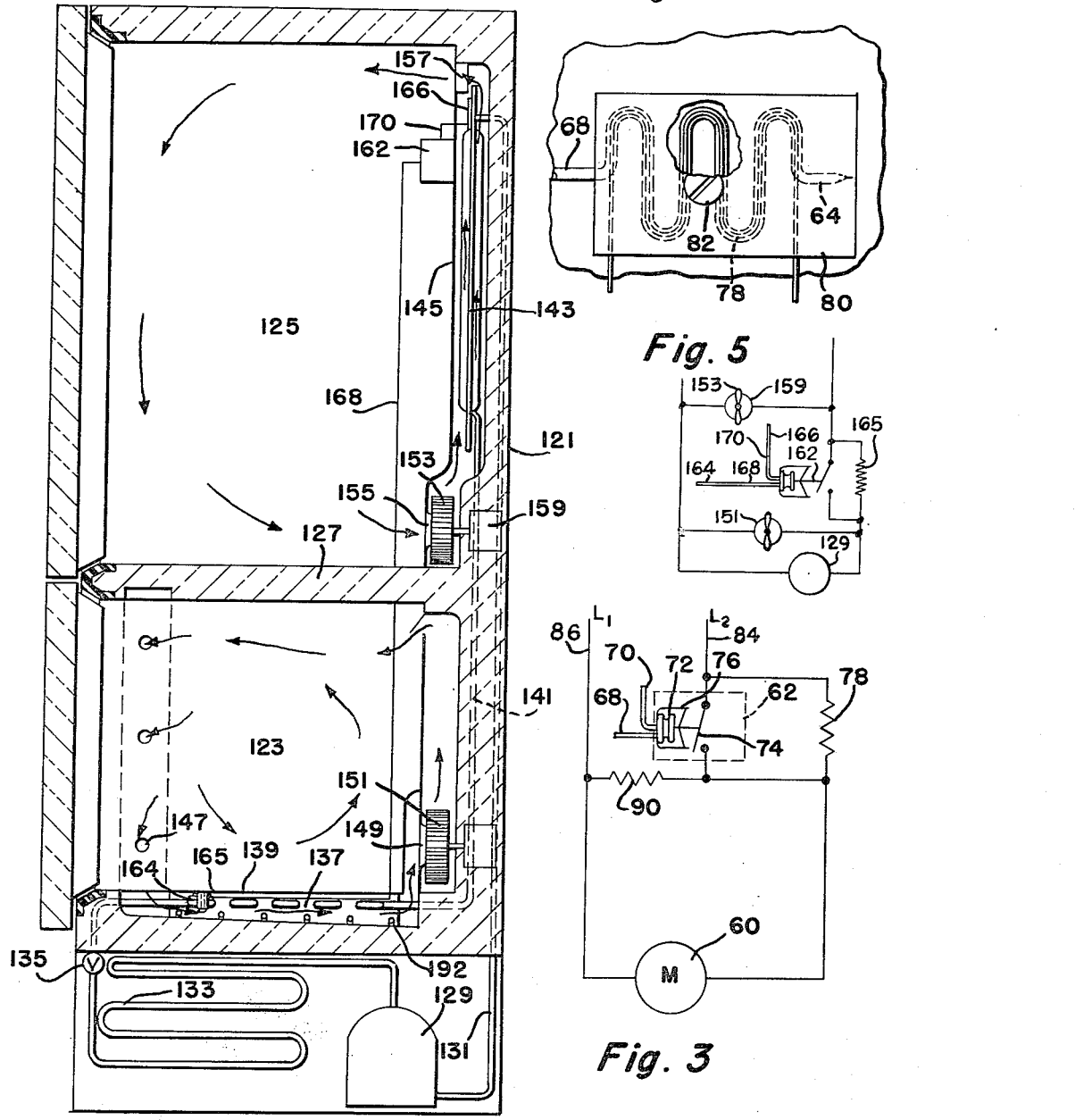

3,043,114
TEMPERATURE CONTROLS FOR REFRIGERATING APPARATUS
John J. O'Connell, Dayton, Ohio, assignor to General Motors Corporation, Detroit, Mich., a corporation of Delaware
Filed Jan. 9, 1961, Ser. No. 81,380
3 Claims. (Cl. 62—209)

This invention pertains to refrigerating apparatus and more particularly to the control of the temperatures in two-compartment household refrigerators.

Many two-compartment household refrigerators are cooled by separate evaporators for each compartment connected in series. The operation of the motor-compressor unit for the dual system has been controlled according to the temperature of the second evaporator in series located in the warmer compartment. This control system provides no direct control of the temperatures of the other colder compartment. Consequently, the temperatures of this other colder compartment fluctuate more than desired.

It is an object of this invention to provide a control for a two-compartment household refrigerator in which the temperature of each compartment is maintained within desired limits.

It is another object of this invention to provide a control for a two-compartment household refrigerator in which the operation of the system is started in response to the temperature of the evaporator for one compartment and terminated in response to the temperature of the evaporator for the other compartment.

It is another object of this invention to provide a control for a two-compartment household refrigerator in which separate evaporators are connected in series and in which the second evaporator in the series is placed in the warmer compartment and in which the operation of the system is started in response to the temperature of the second evaporator in the warmer compartment and stopped in response to the temperature of the evaporator for the other colder compartment.

These and other objects are attained in the two forms shown in the drawings in which the fluid motor for the motor-compressor switch is provided with two bulbs. One of the thermostat bulbs is placed in direct heat transfer with the colder evaporator for the colder compartment and is heated during the idle period by a very small electric heater which is connected in shunt with the cycling switch controlling the motor-compressor unit. This heater heats this one bulb during the idle period and prevents it from controlling the closing of the cycling switch and the starting of the operation of the motor-compressor unit. The second bulb is attached to the second evaporator for the warmer compartment but is partially insulated therefrom by a plastic strip. This insulating arrangement enables the second bulb to be substantially responsive to the temperature of the second evaporator during the idle period so that it will control the start of the operation, but the more rapid cooling during the running period prevents it from controlling the opening of the cycling switch and the stopping of the system.

As an alternative, the second bulb may be clamped directly to the second evaporator and provided with a low wattage heater connected in parallel with the motor-compressor unit so that it is heated during the operating period of the system and is therefore not effective to control the opening of the cycling switch and the stopping of the motor-compressor unit.

The second form is similar in its control arrangement to the first form but differs primarily in that the evaporator for the colder compartment is located outside the below-freezing compartment proper and is cooled by air circulating from the below-freezing compartment into thermal exchange with the evaporator and thence returned to the below-freezing compartment by a suitable fan to prevent the formation and accumulation of frost in this compartment.

Further objects and advantages of the present invention will be apparent from the following description, reference being had to the accompanying drawings wherein preferred embodiments of the present invention are clearly shown.

In the drawings:

FIGURE 2 is a side vertical sectional view of another form of two-compartment refrigerator also embodying a similar form of my invention;

FIGURE 3 is a wiring diagram of the control systems shown in FIGURE 1;

FIGURE 4 is an enlarged plan view showing the arrangement of the thermosensitive element and its heater as indicated in FIGURE 1; and FIGURE 5 is a wiring diagram for the form of refrigerator shown in FIGURE 2.

Figure 1:
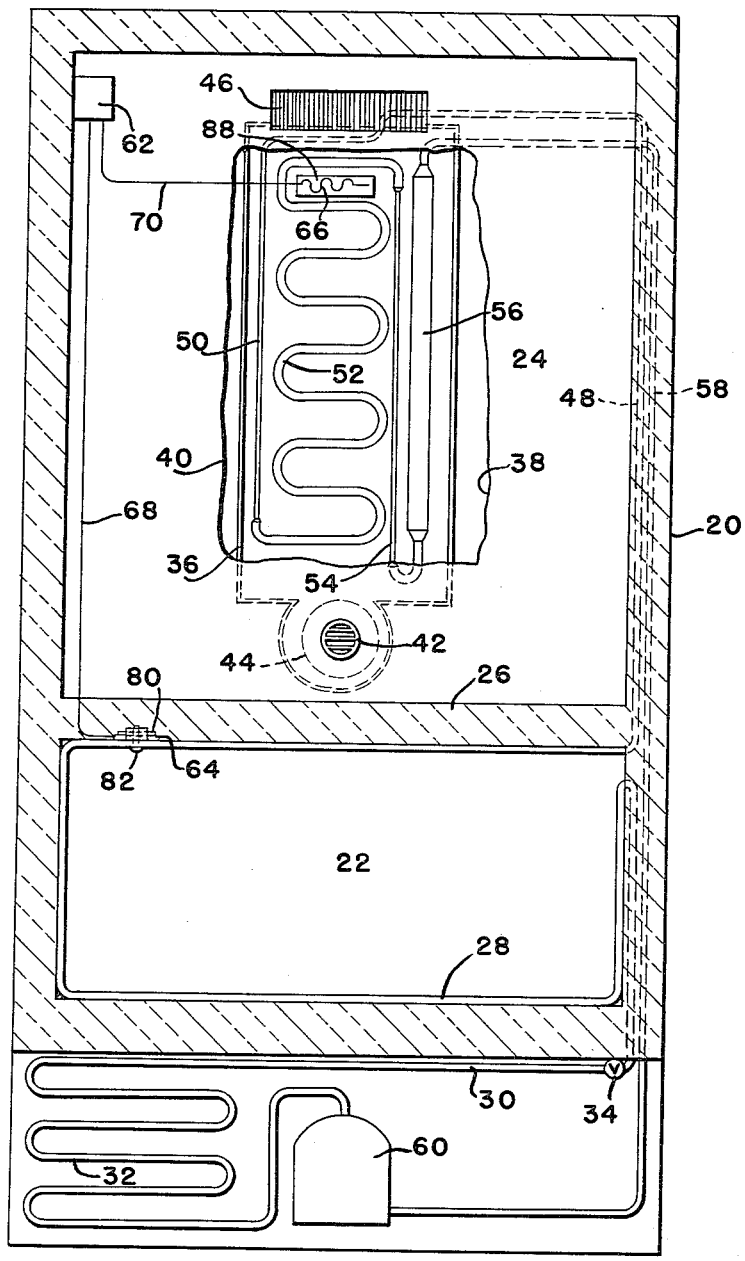
FIGURE 1 is a front vertical sectional view of a two-compartment refrigerator embodying one form of my invention.

Referring now to the drawings and more particularly to FIGURE 1, there is shown a two-compartment refrigerator cabinet 20 provided with a lower below-freezing compartment 22 and an upper above-freezing compartment 24 separated by a horizontal insulated wall 26. The below-freezing compartment 22 is surrounded on four sides by a plate-type refrigerant evaporator 28 which is supplied with liquid refrigerant through a supply conduit 30 from the condenser 32 under the control of a suitable valve or restrictor-type control device 34.

Connected in series with the evaporator 28 and tailing this evaporator 28 is a vertical plate-type evaporator 36 located behind the rear wall 38 in a chamber 40 specially provided for it. Air is drawn through an inlet opening 42 in the bottom portion of the rear wall 38 by a centrifugal fan 44 which discharges the air upwardly on opposite sides of the plate evaporator 36 in the chamber 40, and this air thus cooled is discharged from the chamber 40 through the outlet grille 46 provided in the upper portion of the compartment 24. Specifically, the outlet of the evaporator 28 is connected by the conduit 48 to the upper portion of a downwardly-extending restricted passage 50 in the left side of the refrigerated plate 36. At the bottom, this passage 50 connects with a larger upwardly-extending serpentine passage 52 connecting at the top with a second downwardly-extending restricted passage 54 which at its bottom connects with an upwardly-extending enlarged passage 56, forming an accumulator chamber which connects with the suction conduit 58 connecting with the inlet of the sealed motor-compressor unit 60.

The operation of the sealed motor-compressor unit 60 is controlled by a fluid motor operated, snap-acting switch 62 provided with two thermosensitive bulbs 64 and 66. These bulbs 64 and 66 connect respectively through capillary tubes 68 and 70 with the fluid motor 72 operatively connected to the switch blade 74 under the control of a suitable snap-action mechanism 76. The bulb 64 directly contacts the evaporator 28 and is provided with a one-and-one-half watt electric heater 78. The heater 78 extends in serpentine fashion on top of the serpentine-shaped bulb 64 and is held thereon by a plate 80 which is held in place by the bolt 82 extending through the wall of the evaporator 28. The heater 78 and the switch blade 74 are connected in parallel with each other and in series with the supply conductor 84. The other supply conductor 86 connects in parallel with the compressor motor 60 as shown in FIGURE 3. The fan 151 and the resistance 90 shown in FIGURE 3 are not required for the system shown in FIGURE 1. The thermosensitive element or bulb 6 is not clamped directly to the evaporator 36 but is mounted upon a thin plate or piece 88 or plastic resin which serves as a limited insulator between the bulb 66 and the plate evaporator 36. The snap-action mechanism 76 is provided with a wide differential, such as 35° F., and is calibrated so that the switch will close at 37° F. and open at 2° F.

With the bulb arrangement shown in FIGURES 1 and 4 and with the electrical circuit arranged as shown in FIGURE 3, during the idle period when the switch blade 74 is open, the heater 78 will be in operation furnishing a sufficient amount of heat to the bulb 64 to raise its temperature above the temperature of the bulb 66 so that the operation of the fluid motor 72 and the snap-action mechanism 76 and the switch blade 74 will be responsive to the temperature of the bulb 66. The temperature of the plate evaporator 36 will rise slowly during the idle period. The plate or piece 88 of plastic resin only interferes slightly with this transmission of heat from the thermal bulb 66 to the plate 36 so that the bulb 66 will respond reasonably closely to the temperature of the refrigerated plate 36. When the plate 36 and the bulb 66 reach a temperature of 37° F., sufficient pressure will be developed in the fluid motor 72 to overcome the opposition of the snap-action mechanism 76 to move the switch blade 74 to closed position to start the operation of the motor-compressor unit 60.

The closing of the switch blade 74 will shunt out and deenergize the heater 78 to prevent it from continuing the supply of heat to the thermosensitive bulb 64. The bulb 64 will then be cooled below the temperature of the thermosensitive bulb 66 and will be at substantially the same temperature as the evaporator 28. The interposition of the insulating piece 88 between the bulb 66 and the plate 36 insures that the bulb 66 will be warmer than the bulb 64 during the operating period. Since the bulb 64 is now colder than the bulb or thermosensitive element 66, the thermosensitive bulb or element 64 will be the controlling element and will control the operation of the fluid motor 72. Since the snap-action mechanism 76 provides a differential of about 35° F., the switch blade 74 will remain closed and the motor-compressor unit 60 will remain in operation until the evaporator 28 and the bulb 64 are cooled down to 2° F. This insures that once during every cycle, namely, the end thereof, the evaporator 28 will be cooled substantially to 2° F. Since this evaporator 28 has considerable mass and there is considerable mass ordinarily within the compartment 22, the rise in temperature of the evaporator 28 between operating cycles will be limited. When the bulb 64 and the evaporator 28 do reach the temperature of 2° F., the switch 74 will be opened by the reduction in pressure within the fluid motor 72, thereby reenergizing the heater 78 for the resumption of heating of the thermosensitive bulb 64. Cycling of the refrigerator will continue in this manner normally throughout the day and night to maintain the temperatures of the evaporators 28 and 36 within the limits desired.

If desired, instead of employing the plastic plate or piece 88 to insulate the thermosensitive bulb 66 from the refrigerated plate 36, there may be substituted the same arrangement shown in FIGURE 4 in which a heater 90 of about one-and-one-half watts is substituted for the heater 78 in FIGURE 4. This heater 90, as shown in FIGURE 3, is connected in parallel with the sealed motor-compressor unit so that it is energized primarily whenever the switch 74 is closed. Thus, in this arrangement, after the closing of the switch blade 74 by the reaching of the cut-in temperature of 37° F. by the refrigerated plate 36, the heater 90 is energized to heat the thermosensitive bulb 66 during the running period to insure that the operation of the switch blade 74 at the end of the running period will be controlled by the temperature of the thermosensitive bulb 64.

In FIGURE 2, the invention is shown applied to a frost-free refrigerator in which the cabinet 121 is provided with a lower frost-free below-freezing compartment 123 and an upper above-freezing compartment 125 which are separated from each other by the horizontal insulated wall 127. The sealed motor-compressor unit 129 withdraws evaporated refrigerant from the suction conduit 131 and forwards the compressed refrigerant to a condenser 133 from which liquid refrigerant flows under the control of a suitable valve or restrictor 135 to the first evaporator 137 located beneath the false bottom wall 139 of the below-freezing compartment 123. The outlet from this evaporator 137 is connected through the conduit 141 with the inlet of the refrigerated vertical plate evaporator 143 located in a cavity in the rear wall of the cabinet 121 behind the false rear wall portion 145 of the above-freezing compartment 125. The evaporator 143 is similar to the plate evaporator 36 and its outlet is connected to the suction conduit 131.

Air in the below-freezing compartment 123 is drawn, during the operation of the motor-compressor unit 129, through the apertures or openings 147 in the front portion of the below-freezing compartment into the space below the false bottom wall 139 containing the evaporator 137 through which the air is drawn into the inlet 149 of the fan 151. The fan 151 has its motor electrically connected in parallel with the motor of the sealed motor-compressor unit 129 so that its runs throughout each refrigeration cycle to maintain the circulation of air in the below-freezing compartment 123 in order to maintain below freezing temperatures therein without the accumulation of frost. A second fan 153 is located in the above-freezing compartment 125 and draws air through its inlet 155 and discharges the air upwardly on opposite sides of the evaporator 143 to an outlet 157 in the upper portion of the rear wall of the compartment 125. The motor 159 of the fan 153 may operate continuously or may be controlled by the thermostat responsive to the temperature of the air in the compartment 125.

The fluid motor switch 162 is identical to the switch 62 shown in FIGURES 1 and 3. This switch is connected by the capillary tube 168 to the thermostat bulb 164 mounted on and in direct contact with an end turn of the evaporator 137 in a manner similar to that illustrated in FIGURE 4. In an arrangement similar to FIGURE 4, in conjunction with the thermosensitive bulb 164, there is provided a shunt heater 165 (see FIGURE 5) corresponding to the heater 78 in FIGURE 3. The fluid motor for this switch 162 is connected by a capillary tube 170 with a thermosensitive bulb 166 mounted upon the plate evaporator 143 in a manner similar to that described in FIGURE 1. The thermosensitive bulb 166 may be mounted in either of the arrangements mentioned in connection with FIGURE 1. That is, the bulb 166 may be either mounted on top of a plastic strip or piece or it may be mounted directly onto the evaporator 143 and provided with a heater as is shown in FIGURE 4.

Similarly to the first embodiment, the switch 162 will close when the temperature of the thermosensitive bulb 166 reaches a temperature of 37° F. and this switch 162 will remain closed until the evaporator 137 and the bulb 164 reach a temperature of 2° F. If a heater is used with the bulb 166, corresponding to the heater 90, it will be energized during the closed period of the switch 162. The heater 165 provided in heat transfer with the bulb 164, corresponding to the heater 78, will be energized during all open periods of the switch 162. In this arrangement also, the bulb 164 will always control the opening of the switch 162 while the bulb 166 will always control the closing of the switch 162. Through the use of this control system and the operation of the fans 153 and 151, the compartments 125 and 123 are maintained within desired temperatures without the formation of frost therein. Any frost accumulating on the evaporator 137 may be removed by energizing an electric heater 192 during an idle period of the motor-compressor unit 129.

While the embodiments of the present invention as herein disclosed, constitute preferred forms, it is to be understood that other forms might be adopted.

What is claimed is as follows:

1. Refrigerating apparatus including a first evaporating means for cooling a first fluid and having an outlet, a second evaporating means connected to the outlet of the first evaporating means for cooling a second fluid, a single refrigerant liquefying means for supplying liquefied refrigerant to said first evaporating means and for withdrawing evaporated refrigerant from said second evaporating means, a cycling control for said liquefying means including a fluid motor and a snap-acting switch having a substantial force differential connected to and operated by said fluid motor, a first thermosensitive means thermally associated with said first evaporating means, a second thermosensitive means thermally associated with said second evaporating means, said thermosensitive means being operatively connected to said fluid motor, an electric heater thermally associated with said first thermosensitive means and connected in electrical shunt arrangement with said snap-acting switch, means for decreasing the heat transfer between said second thermosensitive means and said second evaporating means, said cycling control having a substantial temperature differential between open and closed positions of said switch.

2. Refrigerating apparatus including a first evaporating means for cooling a first fluid and having an outlet, a second evaporating means connected to the outlet of the first evaporating means for cooling a second fluid, a single refrigerant liquefying means for supplying liquefied refrigerant to said first evaporating means and for withdrawing evaporated refrigerant from said second evaporating means, a cycling control for said liquefying means including a fluid motor and a snap-acting switch having a substantial force differential connected to and operated by said fluid motor, a first thermosensitive means thermally associated with said first evaporating means, a second thermosensitive means thermally associated with said second evaporating means, said thermosensitive means being operatively connected to said fluid motor, an electric heater thermally associated with said first thermosensitive means and connected in electrical shunt arrangement with said snap-acting switch, a second electrical heater thermally associated with said second thermosensitive means connected in electrical series arrangement with said snap-acting switch, said cycling control having a substantial temperature differential between open and closed positions of said switch.

3. Refrigerating apparatus including a first evaporating means for cooling a first fluid and having an outlet, a second evaporating means connected to the outlet of the first evaporating means for cooling a second fluid, a single-electrically operated refrigerant liquefying means for supplying liquefied refrigerant to said first evaporating means and for withdrawing evaporated refrigerant from said second evaporating means, a cycling control for said liquefying means including a fluid motor and a snap-acting switch having a substantial force differential connected to and operated by said fluid motor, a first thermosensitive means thermally associated with said first evaporating means, a second thermosensitive means thermally associated with said second evaporating means, said thermosensitive means being operatively connected to said fluid motor, an electric heater thermally associated with said first thermosensitive means and connected in electrical shunt arrangement with said snap-acting switch, said snap-acting switch being connected in series with said liquefying means, a heat insulator of limited insulating value between said second thermosensitive means and said second evaporating means, said cycling control having a substantial temperature differential between open and closed positions of said switch.

References Cited in the file of this patent
UNITED STATES PATENTS
2,531,136   Kurtz ---------------- Nov. 21, 1950